(12) United States Patent
Fornos et al.

(10) Patent No.: US 10,730,242 B2
(45) Date of Patent: Aug. 4, 2020

(54) CONTROLLING TEMPERATURE IN AN APPARATUS FOR GENERATING A THREE-DIMENSIONAL OBJECT

(71) Applicant: Hewlett-Packard Development Company, L.P., Houston, TX (US)

(72) Inventors: Pol Fornos, Sant Cugat del Valles (ES); Sergio Puigardeu Aramendia, Sant Cugat del Valles (ES); David Ramirez Muela, Sant Cugat del Valles (ES); Salvador Sanchez Ribes, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 498 days.

(21) Appl. No.: 15/513,457

(22) PCT Filed: Oct. 3, 2014

(86) PCT No.: PCT/EP2014/071243
§ 371 (c)(1),
(2) Date: Mar. 22, 2017

(87) PCT Pub. No.: WO2016/050322
PCT Pub. Date: Apr. 7, 2016

(65) Prior Publication Data
US 2017/0297265 A1    Oct. 19, 2017

(51) Int. Cl.
*B29C 64/393*    (2017.01)
*B29C 35/02*    (2006.01)
(Continued)

(52) U.S. Cl.
CPC ........ *B29C 64/393* (2017.08); *B29C 35/0288* (2013.01); *B29C 64/10* (2017.08);
(Continued)

(58) Field of Classification Search
CPC . B29C 64/386; B29C 64/393; B29C 35/0288; B33Y 50/02
(Continued)

(56) References Cited

U.S. PATENT DOCUMENTS 6,930,278 B1 *   8/2005   Chung ................. B23K 26/34
                                                   219/121.85
7,261,542 B2    8/2007   Hickerson et al.
(Continued)

FOREIGN PATENT DOCUMENTS

CN    1426335 A    6/2003
CN    1976799 A    6/2007
(Continued)

OTHER PUBLICATIONS

International Search Report and Written Opinion dated Jun. 23, 2015, PCT Patent Application No. PCT/EP2014/071243, filed Oct. 3, 2014, European Patent Office.

*Primary Examiner* — Elizabeth A Burkhart
(74) *Attorney, Agent, or Firm* — HP Inc. Patent Department

(57) ABSTRACT

A method of controlling temperature in an apparatus for generating a three-dimensional object comprises performing a calibration test on a sample of build material that is to be used in generating a three-dimensional object, calibrating at least one temperature point from the calibration test, and using the at least one calibrated temperature point during subsequent temperature control of the apparatus.

15 Claims, 12 Drawing Sheets

(51) Int. Cl.
*B33Y 30/00* (2015.01)
*B33Y 50/02* (2015.01)
*B29C 64/386* (2017.01)
*B29C 64/165* (2017.01)
*B33Y 10/00* (2015.01)
*B29C 64/264* (2017.01)
*B29C 64/10* (2017.01)

(52) U.S. Cl.
CPC .......... *B29C 64/165* (2017.08); *B29C 64/264* (2017.08); *B29C 64/386* (2017.08); *B33Y 10/00* (2014.12); *B33Y 30/00* (2014.12); *B33Y 50/02* (2014.12)

(58) Field of Classification Search
USPC ........................................................ 264/40.1
See application file for complete search history.

(56) References Cited

U.S. PATENT DOCUMENTS

| | | |
|---|---|---|
| 8,257,895 B2 | 9/2012 | Zhou et al. |
| 8,738,166 B2 | 5/2014 | Abe et al. |
| 2002/0020945 A1 | 2/2002 | Cho et al. |
| 2004/0026807 A1* | 2/2004 | Andersson ............ B22F 3/004 264/40.1 |
| 2007/0241482 A1 | 10/2007 | Giller et al. |
| 2008/0122141 A1 | 5/2008 | Bedal et al. |
| 2009/0017220 A1 | 1/2009 | Muller et al. |
| 2015/0158251 A1* | 6/2015 | Carrouset ............ B22F 3/1055 700/119 |

FOREIGN PATENT DOCUMENTS

| | | |
|---|---|---|
| CN | 104245284 A | 12/2014 |
| EP | 1296788 | 1/2005 |
| WO | WO-01/38061 A1 | 5/2001 |
| WO | WO-2005/011959 A1 | 2/2005 |
| WO | WO-2014/032895 | 3/2014 |

* cited by examiner

CONTROLLING TEMPERATURE IN AN APPARATUS FOR GENERATING A THREE-DIMENSIONAL OBJECT

CLAIM FOR PRIORITY

The present application is a national stage filing under 35 U.S.C. § 371 of PCT application number PCT/EP2014/071243, having an international filing date of Oct. 3, 2014, the disclosure of which is hereby incorporated by reference in its entirety.

Additive manufacturing systems that generate three-dimensional objects on a layer-by-layer basis have been proposed as a potentially convenient way to produce three-dimensional objects.

BRIEF DESCRIPTION OF THE DRAWINGS

For a better understanding of the examples described herein, and to show more clearly how the examples may be carried into effect, reference will now be made, by way of example only, to the following drawings in which.

DETAILED DESCRIPTION

Figure 1:
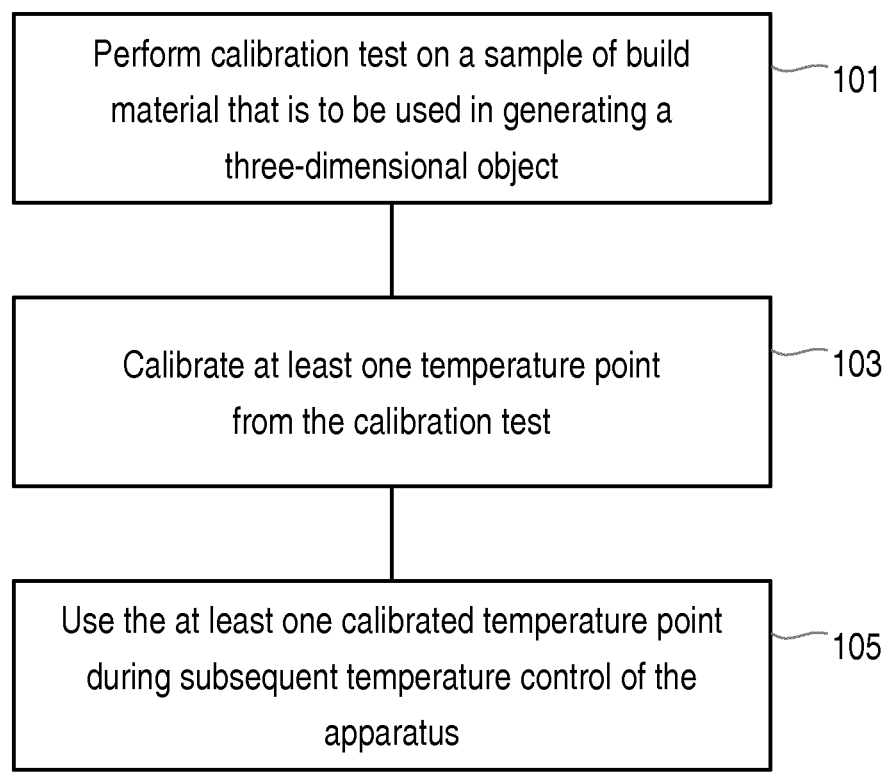
FIG. 1 shows an example of a method for controlling temperature.

A process of generating a tangible three-dimension object may comprise, for example, a series of steps which include forming a layer of build material, selectively delivering an agent (for example a coalescing agent and a coalescence modifier agent) to one or more portions of a surface of the layer of build material, and temporarily applying a predetermined level of energy to the layer of build material. The temporary application of energy may cause portions of the build material on which coalescing agent has been delivered or has penetrated to heat up above the melting point of the build material and to coalesce. Upon cooling, the portions which have coalesced become solid and form part of the three-dimensional object being generated. These steps are then repeated to form a three-dimensional object. Other steps and procedures may also be used with these steps for generating a three-dimensional object.

In the examples described herein a coalescing agent and coalescence modifier agent can comprise fluids that may be delivered using any appropriate fluid delivery mechanism, also referred to as an agent distributor. In one example the agents are delivered in droplet form.

A coalescence modifier agent may be used for a variety of purposes. In one example, a coalescence modifier agent may be delivered adjacent to where coalescing agent is delivered, for example to help reduce the effects of lateral coalescence bleed. This may be used, for example, to improve the definition or accuracy of object edges or surfaces, and/or to reduce surface roughness. In another example, coalescence modifier agent may be delivered interspersed with coalescing agent, which may be used to enable object properties to be modified.

The examples described herein refer to a build material. In one example a build material is a powder-based build material. As used herein, the term powder-based material is intended to encompass both dry and wet powder-based materials, particulate materials, and granular materials.

The examples described herein are related to a method and apparatus for controlling temperature in an apparatus for generating a three-dimensional object, wherein at least one temperature point in a build process is calibrated, for example a melting point and/or a crystallization point in a build process. As used in this document, "melting point" means the temperature at which build material becomes a coherent mass, for example by sintering, melting, fusing or coalescing. As will be described in greater detail in the examples below, a calibration test may be performed to calibrate the at least one temperature point, the calibration test based on the build material that is to be used in generating a three-dimensional object. The calibration of at least one temperature point can, according to an example, have the advantage of enabling a more accurate control of the temperature of the build material in relation to such calibrated temperature point(s), for example at a melting point and/or a crystallization point, when building a three-dimensional object or component.

When generating a three-dimensional object, in one example the build material (e.g. powder or particulate material) is preheated between a crystallization temperature and a melting temperature. For example, the build material may be heated and kept just below a fusing temperature and kept above the crystallization point of the build material. Depending on the type of build material used (for example which type of powder-material, or which type of plastic, or the particular manufacturer used), the crystallization and melting points can change substantially. It is noted that there can also be variability in sensors that are used to monitor temperature, or other system components which are used to generate a three-dimensional object.

According to the examples described herein, by calibrating at least one temperature point, for example at least one of the melting or crystallization points for a particular build material, this can enable the characteristics of the build material to be controlled more accurately, allowing a three-dimensional object to be generated more reliably.

FIG. 1 shows an example of a method of controlling temperature in an apparatus for generating a three-dimensional object. The method comprises performing a calibration test on a sample of a build material that is to be used in generating a three-dimensional object, step 101. At least one temperature point is calibrated from the calibration test, step 103. In step 105, the at least one calibrated temperature point is used during subsequent temperature control of the apparatus.

Figure 2:
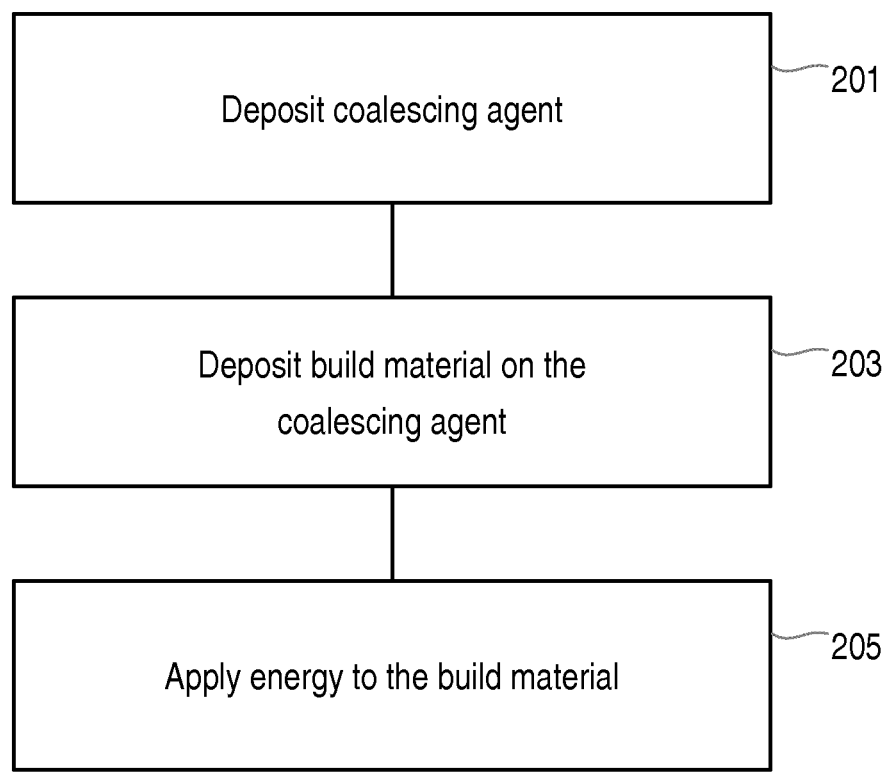
FIG. 2 shows an example of a method relating to a calibration test.

FIG. 2 shows an example of a method for performing a calibration test for calibrating at least one temperature point.

The calibration test may be used, for example, in calibrating a crystallization point and/or a melting point that are to be used in a build process. The method comprises depositing coalescing agent, for example on at least a portion of a build zone, step 201. It is noted that the coalescing agent may comprise any material or fluid that is used to interact or coalesce with build material when exposed to an energy source. For example the coalescing agent may comprise an absorbent ink or other printing fluid. It is noted that a coalescence modifier agent may also be deposited on or with the coalescing agent. In step 203, build material is deposited over the coalescing agent. For example, a layer of build material may be deposited over at least a part of the coalescing agent where a monitoring operation is to be performed. In one example a single layer of build material is deposited on the coalescing agent. In another example multiple layers of build material are deposited on the coalescing agent. In step 205 energy is applied to the build material. For example, the energy may be applied by an energy source for heating the build material, for example a lamp, a source of visible light, a source of ultra-violet light, a source of microwave energy, a source of radiation, or a laser source. Other sources of energy or heat may also be used. In one example a controlled amount of energy is applied.

In one example step 201 comprises depositing coalescing agent over at least a portion of a build zone, for example in an area where temperature measurements are to be monitored or taken, for example in just a central area of the build zone, or in just one corner. According to another example, step 201 comprises depositing coalescing agent in a plurality of areas which are monitored to form an average or minimum or maximum value. In such an example a calibration test may be performed in each one of a plurality of regions that can be separately monitored. In another example, step 201 comprises depositing coalescing agent over an entire build zone. In each of these examples at least one thermal sensor, for example a thermal camera or a sensor array, may be used to monitor a particular region or multiple regions, or the entire build zone.

Figure 3A:
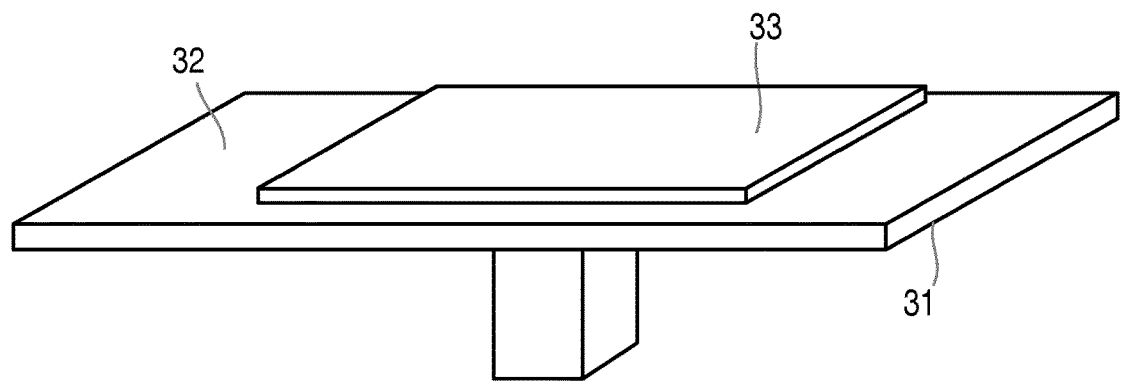
FIGS. 3a to 3c are examples illustrating a method for performing a calibration test.
Figure 3B:
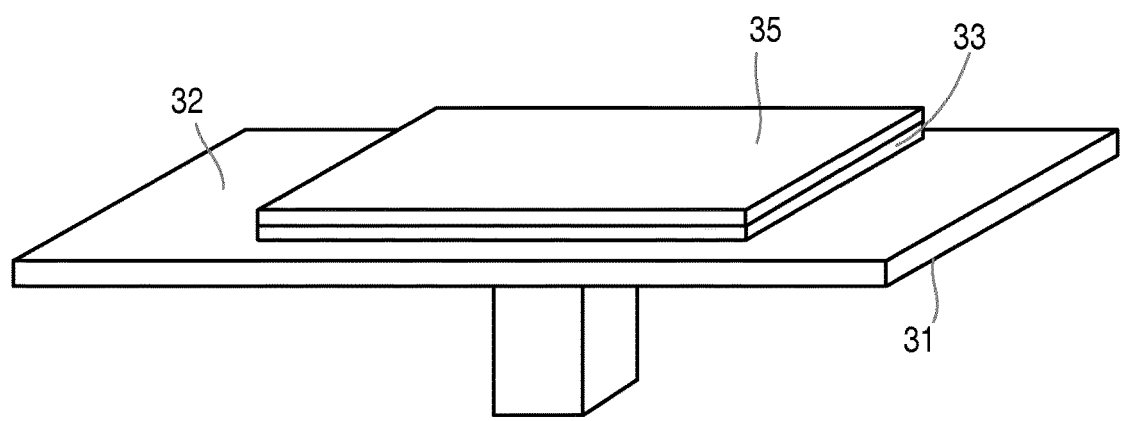
Figure 3C:
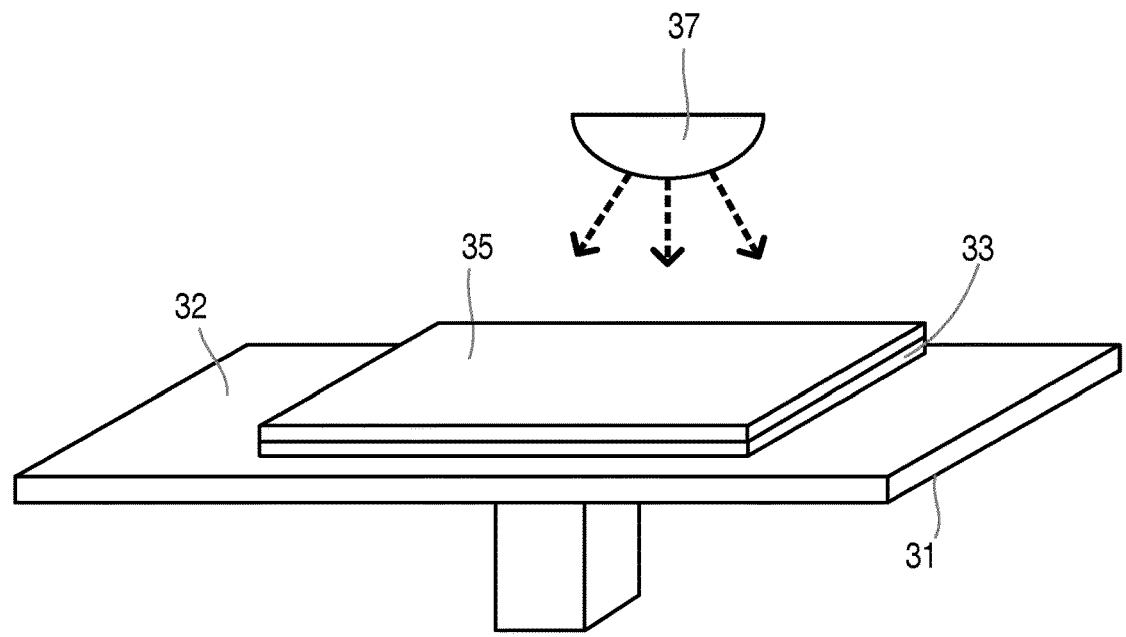

FIGS. 3a to 3c show an example illustrating further how the method of FIG. 2 may be carried out. In FIG. 3a coalescing agent 33 is shown as being deposited, for example in at least a portion of a build zone 32 (the build zone being defined, for example, by a support 31, for example the surface of a bed, such as a powder bed). In FIG. 3b build material 35, for example a layer of powder, is formed or deposited over the coalescing agent 33. In one example the layer of build material is deposited over an entire print area (and thus over the coalescing agent). In another example the layer of build material is deposited over at least a portion of the coalescing agent. As mentioned above, a single layer or multiple layers of build material may be deposited. It is noted that the thicknesses of the layers shown in the Figures are for illustrative purposes only, and may differ or vary from what is shown. FIG. 3c shows energy 37 being applied over the build material, for example a controlled energy from a lamp or heat source which heats the build material 35. As mentioned above, the coalescing agent and build material may be deposited over other regions or areas, other than the example shown in FIGS. 3a to 3c.

Figure 4:
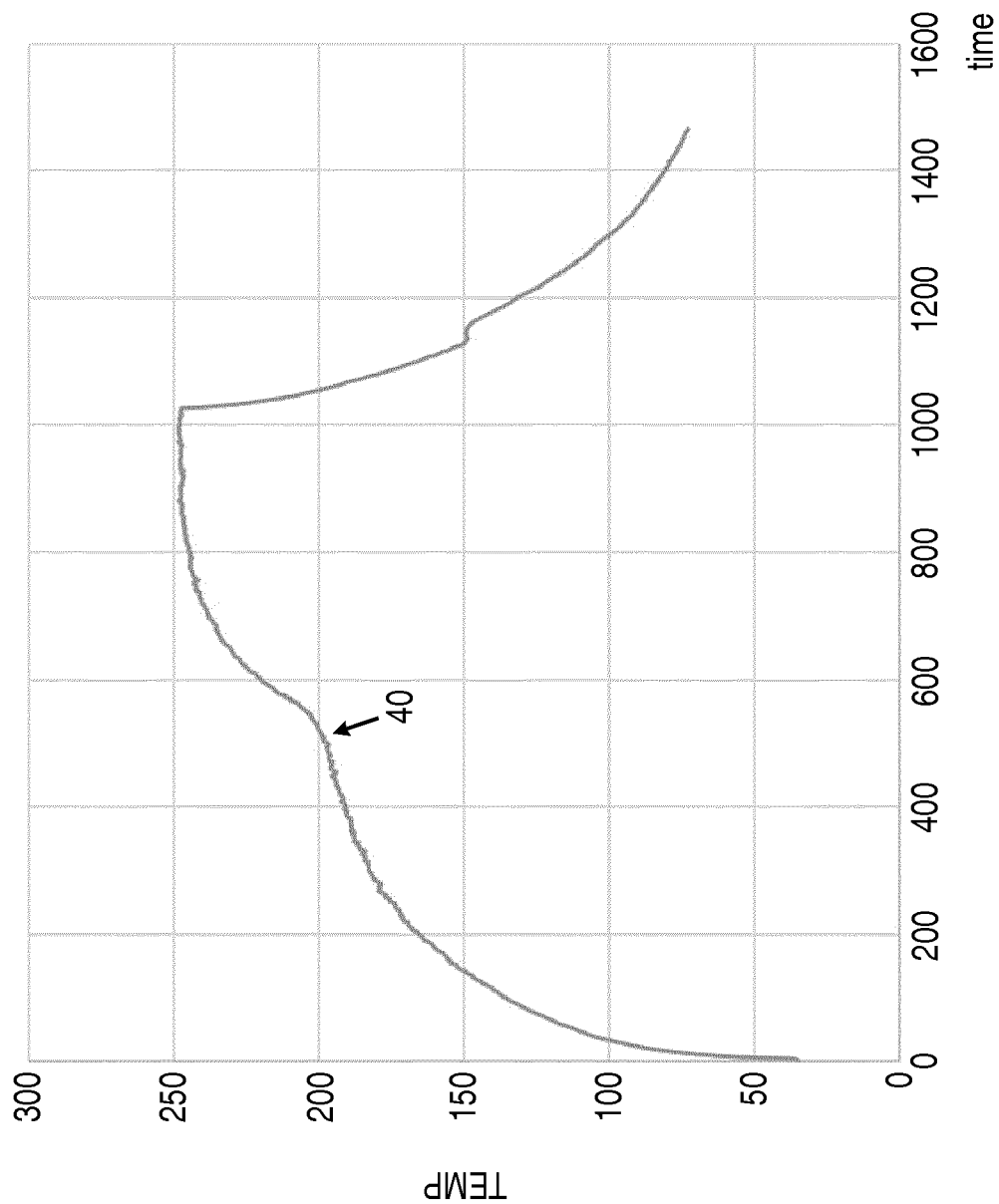
FIG. 4 shows an example of a temperature curve, and illustrates an example of a melting point.

FIG. 4 shows an example of a temperature curve, and illustrates an example of a melting point of a build material. As energy is applied over the build material, the temperature rises until a region 40 is reached, corresponding to a temperature point at which a melting point is reached. In one example this process will occur at a constant temperature for a particular build material (i.e. regardless of which coalescing material is used, for example when the build material has the greater effect on the melting point). In such an example a calibration test may be performed for each build material being used. In another example, this process will occur at a constant temperature for a particular combination of build material and coalescing agent. In such an example a calibration test may be performed for each combination of build material and coalescing agent being used.

Therefore, by performing the calibration steps of Figurers 2 or 3a to 3c, and then determining at which temperature the melting point is reached, this enables an example to calibrate the melting point for a particular build material, or combination of build material and coalescing agent.

In one example a temperature curve or temperature data may be monitored while a calibration test such as that shown in FIGS. 2 and 3a to 3c is performed.

Figure 5:
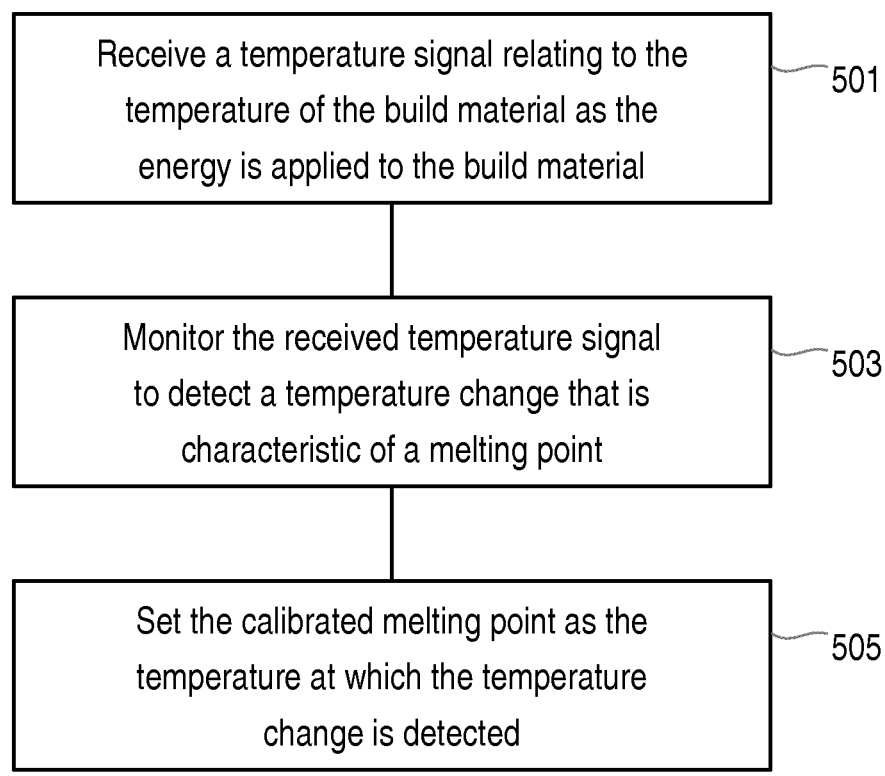
FIG. 5 shows an example of a method for calibrating a melting point.

FIG. 5 shows an example of a method for calibrating the melting point. In step 501 a temperature signal relating to the temperature of the build material is received as the energy is applied to the build material. The temperature signal may be received, for example, from a temperature sensor that monitors the temperature of the build material. It is noted that a temperature sensor may comprise, for example, a non-contact temperature sensor or a thermal sensor, such as an Infra Red sensor. In one example the temperature sensor is a temperature sensor that is also used in part of a normal build process. More than one sensor may also be used where multiple regions are being monitored. The received temperature signal is monitored to detect a temperature change that is characteristic of a melting point, step 503. Detecting the temperature change may comprise, for example, detecting the characteristic 40 shown in the temperature curve of FIG. 4. The calibrated melting point is then set as the temperature at which the temperature change is detected, step 505.

In one example, monitoring a temperature signal comprises monitoring a profile of a temperature curve or monitoring temperature data. This may involve comparing a received temperature curve with a predetermined temperature curve or profile, or by matching a temperature curve with a set of temperature curves. In one example, monitoring a temperature signal comprises comparing received temperature data with predetermined data which represents a melting point, for example to detect a particular pattern in the received temperature data.

Figure 6:
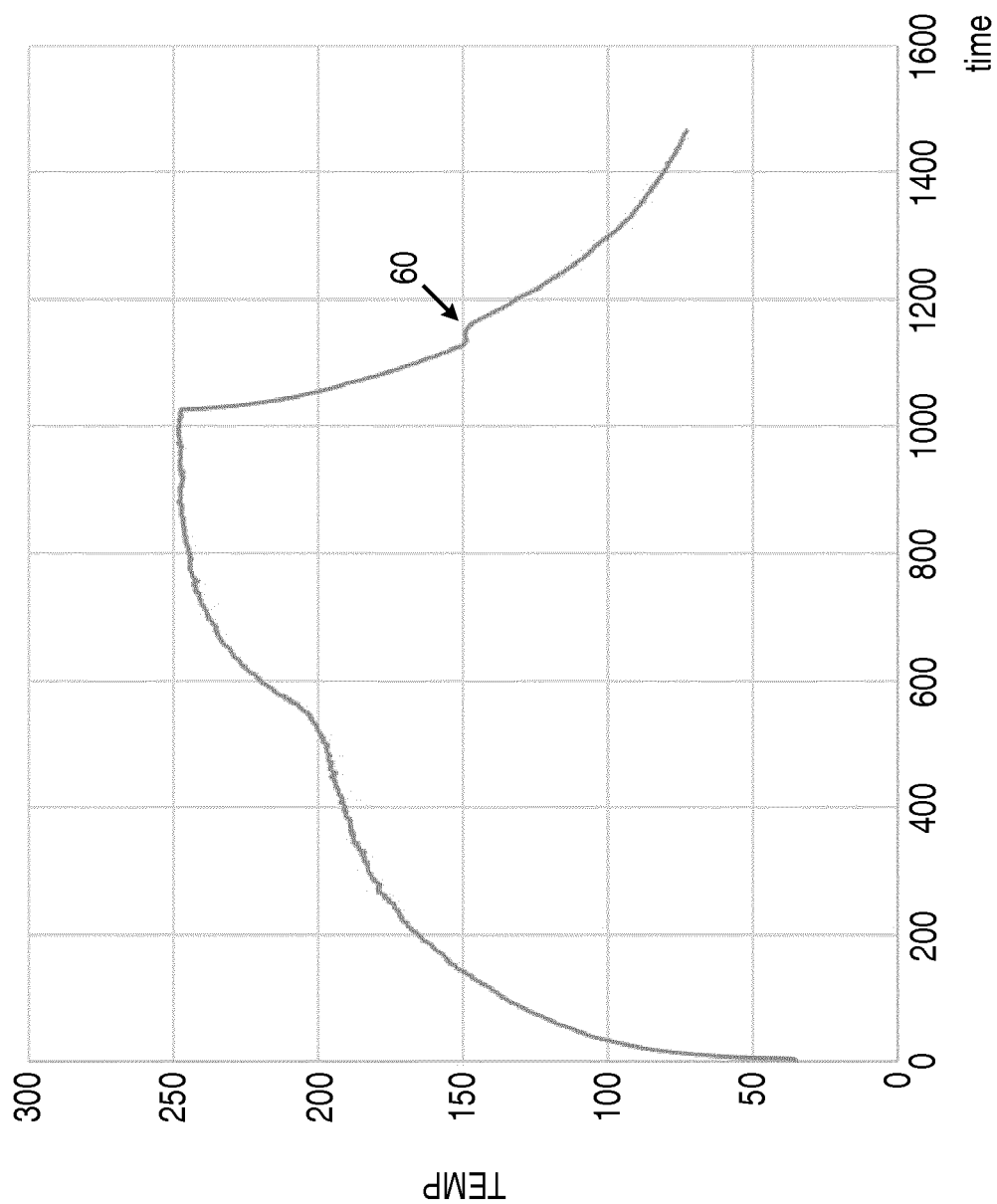
FIG. 6 shows an example of a temperature curve, and illustrates an example of a crystallization point.

FIG. 6 shows an example of a temperature curve, and illustrates an example of a crystallization point 60. The temperature curve may be generated, for example, by the method shown in FIGS. 2 or 3a to 3c. After the energy source is removed and the build material allowed to cool, the temperature falls until a region 60 is reached, corresponding to a temperature at which a crystallization point is reached. In one example this process will occur at a constant temperature for a particular build material (i.e. regardless of which coalescing material is used, for example when the build material has the greater effect on the crystallization point). In such an example a calibration test may be performed for each build material being used. In another example, this process will occur at a constant temperature for a particular combination of build material and coalescing agent. In such an example a calibration test may be performed for each combination of build material and coalescing agent being used.

Figure 7:
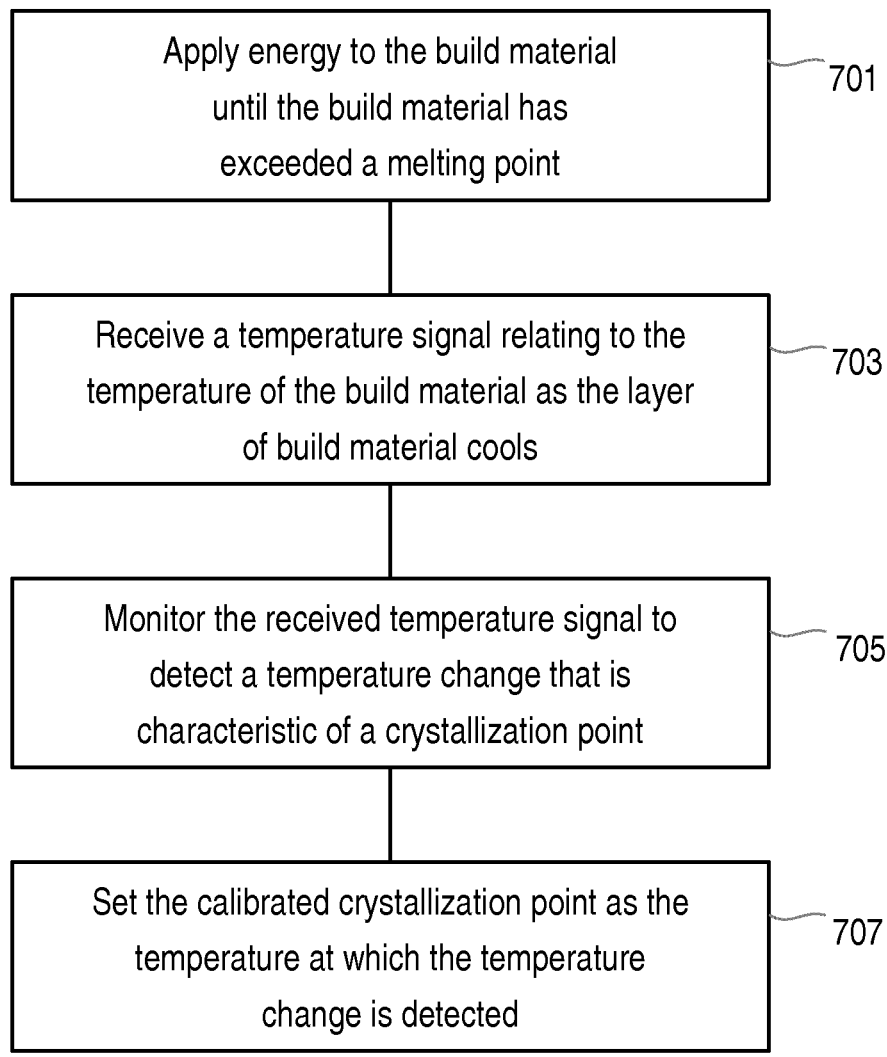
FIG. 7 shows an example of a method for calibrating a crystallization point.

FIG. 7 shows an example of a method for calibrating a crystallization point. In step 701 the method comprises applying energy to the build material (the build material being over a coalescing agent, for example as described in the examples of FIGS. 2 and 3*a* to 3*c*), until the build material has exceeded a melting point. In step 703 a temperature signal is received relating to the temperature of the build material as the build material cools. The received temperature signal is monitored to detect a temperature change that is characteristic of a crystallization point, step 705. The calibrated crystallization point is set as the temperature at which the temperature change is detected, step 707.

In one example the rate at which the build material cools to the crystallization point is controlled, for example by controlled removal of the energy source.

As with the example of the melting point described above, the monitoring of a temperature signal may comprise monitoring a profile of a temperature curve or monitoring temperature data. This may involve comparing a received temperature curve with a predetermined temperature curve or profile, or comparing received temperature data with predetermined data which represents a crystallization point, for example to detect a particular pattern in the received temperature data, or by matching a temperature curve with a set of temperature curves.

Thus, in an example described herein, detecting a characteristic temperature change may comprise comparing the profile of the temperature curve with at least one predetermined curve representing the characteristic of a crystallization point or melting point, or comparing temperature data with predetermined temperature data representing the characteristic of a crystallization point or melting point.

An example may therefore involve the analysis of temperature logs to determine a melting point using a thermal sensor. Since the phase change of the build material/coalescing agent occurs at a consistent temperature, it can be monitored and well-defined as shown for example in FIG. 4 above. The crystallization point can be determined by the same methodology, based on the characteristics shown for example in FIG. 6 above.

While the examples described above relate to monitoring a temperature signal, such as a temperature curve or temperature data, according to one example the calibration of a melting point may be performed visually.

Figure 8A:
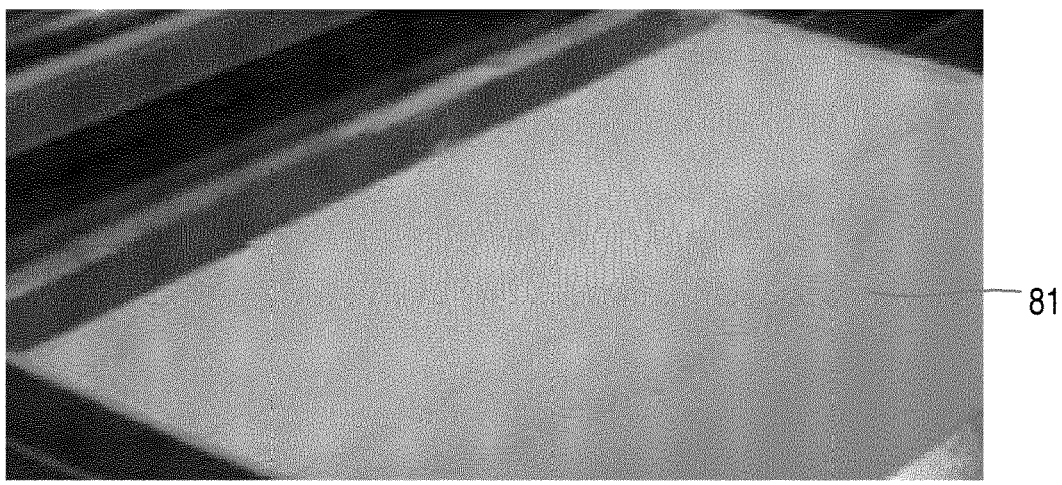
FIGS. 8a to 8c show an example of a visualisation method.
Figure 8B:
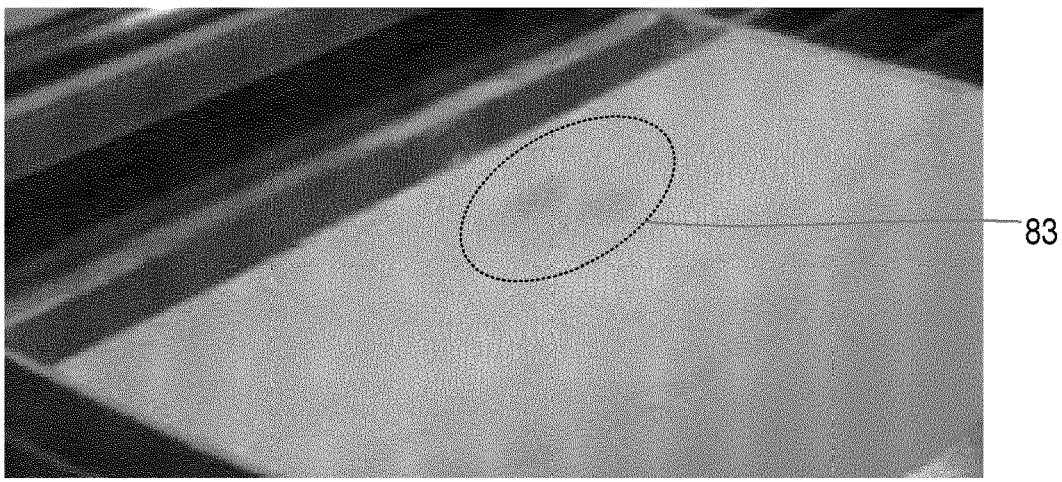
Figure 8C:
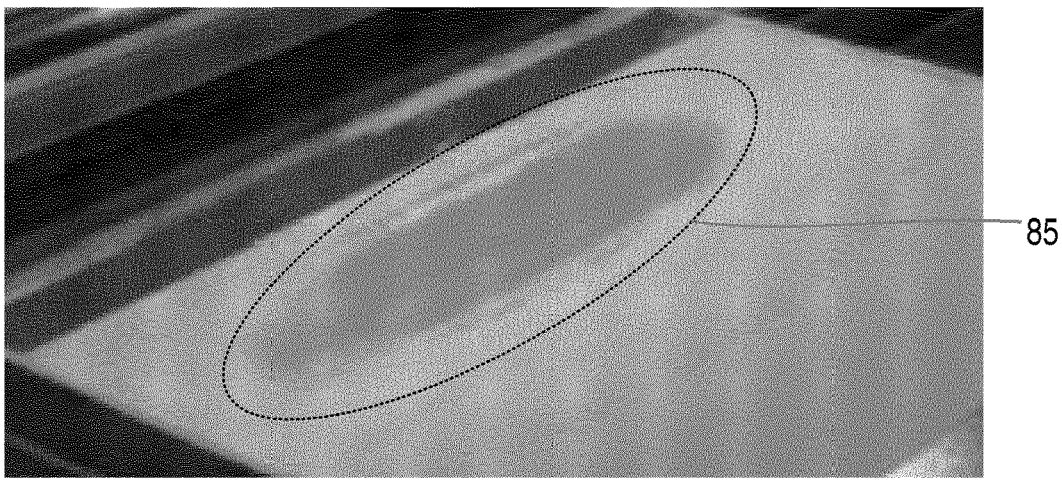

FIGS. 8*a* to 8*c* show an example of how a temperature point may be calibrated using a visual indicator.

FIG. 8*a* shows a layer of build material 81 which has been deposited over a coalescing agent. In response to being exposed to an energy source, for example heated by a lamp or heat source, the build material begins to undergo a phase change as the temperature rises, the phase change illustrated by section 83 in FIG. 8*b*. As the temperature continues to rise, a melting point can be visually determined when the coalescing agent and build material have melted and fused, as illustrated by the section 85 in FIG. 8*c*.

Figure 9:
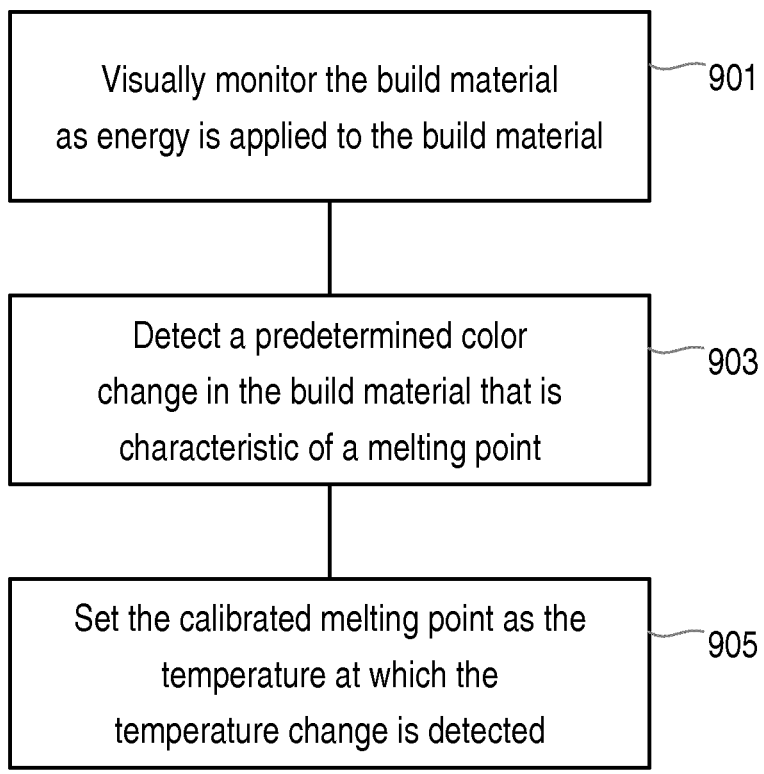
FIG. 9 shows an example of a method for calibrating a crystallization point.

FIG. 9 shows a method according to an example for calibrating a melting point. The method comprises, in step 901, visually monitoring the build material as energy is applied over the build material. In step 903 a predetermined color change in the build material is detected, that is characteristic of a melting point. In step 905 the calibrated melting point is set as the temperature at which the predetermined color change is detected.

In one example detecting a predetermined color change comprises determining whether a color density has reached a specified level.

In one example the visual monitoring is performed by an optical sensing device. In an example where a sensor comprises a light sensor or densitometer, the step of monitoring may comprise taking a value, and determining whether this read value has reached a threshold value, such as a previously established threshold value (for example performed during a previous calibration test for a particular build material and/or coalescing agent being used). In another example the visual monitoring is performed by an operator of the apparatus.

Thus, in one example a melting point can be determined by visual observation, for example observing the color modification of the top layer or surface of the build material. When the color density reaches a specified level, for example corresponding to FIG. 8*c*, it indicates the fusion of the build material, for example complete fusion of the powder. Using an optical sensing device it is possible to define the melting point, and calibrate the melting point as the temperature of the build material at that point.

In an example, applying a controlled energy may comprise applying heat above the build zone until the coalescing agent penetrates through at least part of the build material.

Figure 10:
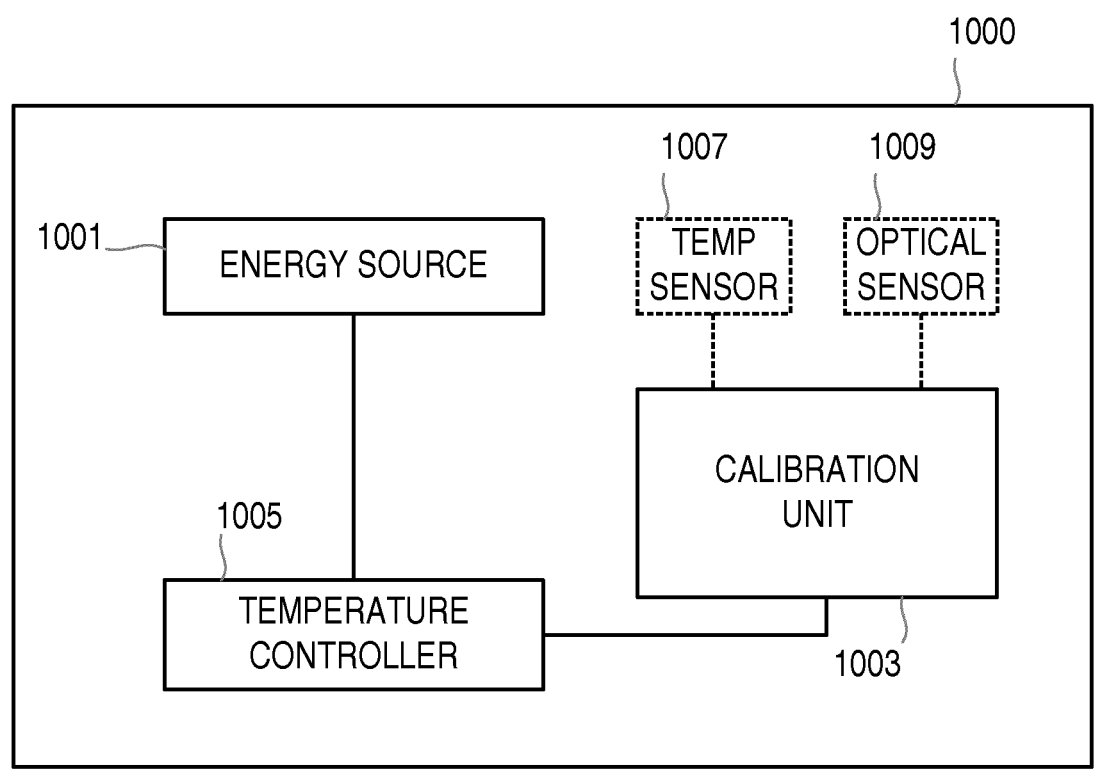
FIG. 10 shows an example of an apparatus for generating a three-dimensional object.

FIG. 10 shows an example of an apparatus 1000 for generating a three-dimensional object. The apparatus comprises an energy source 1001 to heat a build material. A calibrating unit 1003 calibrates at least one temperature point using a sample of build material that is to be used to generate a three-dimensional object. A temperature controller 1005 controls the energy source 1101 using the at least one calibrated temperature point. For example, the temperature controller 1005 can adapt or adjust the power supplied to an energy source, or the energy emitted thereby, according to the calibrated temperature, such that a more accurate build process can be carried out.

In one example the apparatus 1000 comprises a temperature sensor 1007 coupled to the calibration unit 1003, to provide the calibration unit with temperature signals relating to the build material (for example for monitoring a temperature curve or temperature data as mentioned above). In one example the apparatus 1000 comprises an optical sensor 1009 coupled to the calibration unit, to monitor a surface of the build material during a calibration test (for example to optically detect a particular temperature point as described above).

Figure 11:
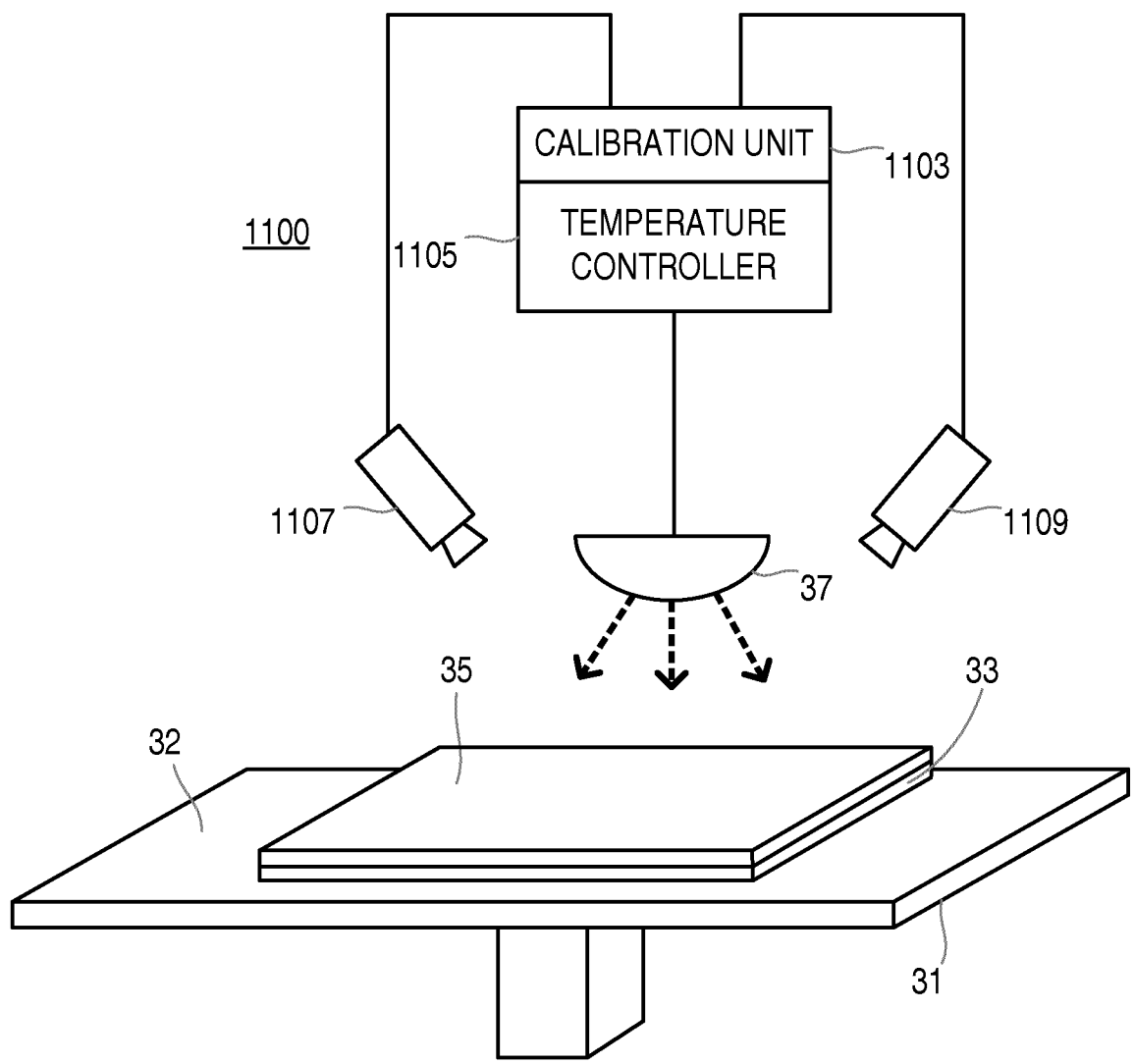
FIG. 11 shows an example of an apparatus for generating a three-dimensional object.

FIG. 11 shows an example of an apparatus 1100 in which a calibration test may be performed, for example according to the steps shown in FIGS. 3*a* to 3*c* (e.g. by applying an energy 37 over a build material 35 which has been deposited on a coalescing agent 33), and temperature then controlled accordingly. The apparatus may comprise a temperature sensor 1107 and/or an optical sensor 1109, for example for respectively monitoring a temperature curve/data and/or visual monitoring as described above.

Figure 12:
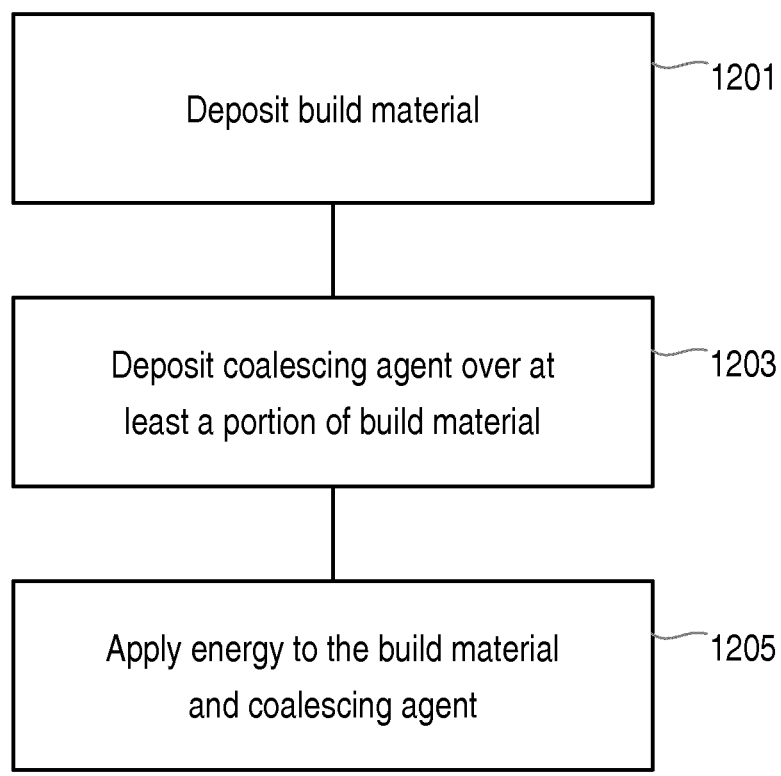
FIG. 12 shows another example of a method relating to a calibration test.

In the examples described above a calibration test is performed by depositing a build material over a coalescing agent. According to another example shown in FIG. 12, however, a calibration test may involve depositing a build material, step 1201, and then depositing a coalescing agent over at least a portion of the build material, step 1203, and applying energy to the build material and coalescing agent, step 1205. The step of depositing a build material may comprise depositing a single layer of build material, or depositing multiple layers of build material. In one example the steps described above for calibrating at least one temperature point may then be carried out, for example by electronically monitoring temperature curves or temperature data, or visually monitoring a surface, in order to calibrate the at least one temperature point (for example a melting point or a crystallization point).

In an example of an apparatus for generating a three-dimensional object, selective portions of a layer of build material can be coalesced or fused on a support which supports the build material (for example a support bed). Portions of the layer of build material on which an agent has been deposited, for example selectively distributed with an agent distributor (for example a coalescing agent and a coalescence modifier agent) are coalesced, thus avoiding the rest of the build material on the support from reaching the fusing or melting point. By calibrating at least one of these temperature points, any variability of the temperature where each different build material crystallizes and fuses can be compensated for. The calibration can also compensate for a variability in a system parameter, such as sensor sensitivity.

By calibrating a temperature point, for example a crystallization point and/or a melting point of a build material, this enables an example to provide a more precise control of the build process.

A more precise control can lead to an improved melting process, and avoid poor quality objects from being generated, which might occur if the temperature points for a particular build material are not known precisely enough.

From the above it can be seen that an example comprises determining the melting point by depositing a coalescing agent, for example an absorbent ink that covers most of the build zone, recoating it with build material, for example with a powder, and applying a controlled temperature.

In an example the melting point may be determined by applying energy, such as heat from a lamp, above the build zone such that the temperature rises until the build material (e.g. powder) reaches a point where the coalescing agent will rise through the build material (for example in an area where coalescing agent is applied). This process will occur at a constant temperature, as shown in FIG. 4 above.

In an example the crystallization point may be determined as follows. Once the melting point is surpassed, heating is no longer needed. Cooling, for example by removal of the energy source, or at a controlled pace, will crystallize the fused powder, also at a constant temperature, as shown in FIG. 6 above.

A calibrated temperature point, for example the melting point and/or crystallization point, can be stored and used by a temperature controller. In one example a calibrated temperature value(s) is used for the whole batch of build material. In another example a calibrated temperature value(s) may be used for a current job/bucket, such that in this way variations due to environmental conditions, for example, are taken into account. In one example, a calibrated temperature value may be stored with other material calibrations in a "profile" which is generated ad-hoc or dynamically for a particular build material.

The examples enable at least one precise working point of a build material, for example a powder or particulate material, to be determined and calibrated, independently of a particular manufacturer or batch.

Thus, in one example the crystallization point and/or melting point are calibrated once for a particular batch of build material, and the apparatus controlled accordingly during subsequent processing of that particular batch of build material.

In one example, the crystallization point and/or melting point are calibrated on a sample of build material from a batch of build material, and the apparatus controlled accordingly during subsequent processing of that particular batch of build material.

In one example, the crystallization point and/or melting point are calibrated for a build material as the build material is being used to build a three-dimensional object.

In one example the calibration of a temperature, for example the crystallization point and/or the melting point, is performed periodically to compensate for any environmental conditions that affect the build material.

The process of generating a three-dimensional object can be made more robust, according to an example, by being able to correct the possible external contamination suffered by a build material (such as a powder) due to aging, temperature, or relative humidity.

The examples described herein can enable a more stable, precise and controlled, printing process to be provided. An example enables desired properties (for example mechanical, accuracy or appearance) to be reproduced with any powder or particulate material.

In one example, any variability in sensors or other components used to monitor temperature, or other system components which are used to generate a three-dimensional object, may be compensated due to the calibration operation being carried out in the apparatus where a three dimensional object is to be generated, therefore taking any such variables into consideration during the calibration operations.

According to an example there is provided a method of controlling the temperature of a build material used to generate a three-dimensional object, the method comprising: preheating the build material to a temperature between a crystallization point of the build material and a melting point of the build material; wherein at least the crystallization point and/or the melting point is calibrated prior to preheating.

Although some of the examples described above refer to delivering a coalescing agent and a coalescence modifier agent, it is noted that the examples may be used with an apparatus that delivers just one form of agent, or multiple different agents.

In the examples above, by delivering the build material over an agent, rather than vice versa, this has an advantage of enabling a melting point to be detected more easily.

It should be noted that the above-mentioned examples illustrate rather than limit what is described herein, and that those skilled in the art will be able to design many alternative examples without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of controlling temperature in an apparatus for generating a three-dimensional (3D) object, the method comprising:
   performing, by a processor, a calibration test on a sample of build material that is to be used in generating the 3D object, including:
      depositing the sample of build material in a build zone,
      applying heat to the sample of build material in the build zone,
      monitoring a rise of a temperature of the sample of build material as the heat is applied to the sample of material, and
      determining a first point during the rise of the temperature of the sample of build material where the temperature of the sample of build material is constant for a time period, wherein the constant temperature at the first point indicates a melting point of the build material;

calibrating a melting temperature of the build material based on the constant temperature at the first point from the calibration test; and using the calibrated melting temperature of the build material for subsequent temperature control of the apparatus for generating the 3D object.

2. A method as claimed in claim 1, wherein performing the calibration test further comprises:

depositing a coalescing agent in the build zone prior to depositing the sample of build material in the build zone, wherein the constant temperature at the first point indicates a melting temperature of the coalescing agent and the build material.

3. A method as claimed in claim 2, wherein applying the heat to the sample of build material in the build zone comprises applying the heat above the build zone until the sample of build material and the coalescing agent coalesce, or until the coalescing agent is absorbed through at least part of the sample of build material.

4. A method as claimed in claim 1, wherein depositing the sample of build material in the build zone includes depositing multiple layers of the build material in the build zone.

5. A method as claimed in claim 1, wherein determining the first point where the temperature of the sample of build material is constant comprises:

receiving a temperature signal relating to the temperature of the sample of build material in the build zone as the heat is applied to the sample of build material;

monitoring the received temperature signal to detect a zero temperature change that is characteristic of a melting point.

6. A method as claimed in claim 5, wherein monitoring the received temperature signal to detect the zero temperature change comprises monitoring a profile of a temperature curve or monitoring temperature data.

7. A method as claimed in claim 6, wherein detecting the zero temperature change comprises:

comparing the profile of the temperature curve with at least one predetermined curve representing the characteristic of the melting point; or comparing the temperature data with predetermined temperature data representing the characteristic of the melting point.

8. A method as claimed in claim 1, further comprising:

ceasing the applying of the heat to the sample of build material after the temperature of the sample of build material has exceeded the melting temperature;

monitoring a temperature signal relating to the temperature of the sample of build material as the sample of build material cools;

detecting a second point during the cooling of the sample of build material where the temperature of the sample of build material is constant, wherein the constant temperature at the second point during the cooling of the sample of build material is characteristic of a crystallization point; and setting the constant temperature at the second point as a crystallization temperature of the build material.

9. A method as claimed in claim 8, wherein monitoring the temperature signal relating to the temperature of the sample of build material as the sample of build material cools comprises monitoring a profile of a temperature curve or monitoring temperature data.

10. A method as claimed in 9, wherein monitoring the profile of the temperature curve or the temperature data comprises:

comparing the profile of the temperature curve with at least one predetermined curve representing the characteristic of the crystallization point; or comparing the temperature data with predetermined temperature data representing the characteristic of the crystallization point.

11. A method as claimed in claim 1, wherein monitoring the rise of the temperature of the sample of build material and determining the first point where the temperature of the sample of build material is constant comprise:

visually monitoring the sample of build material in the build zone as the heat is applied to the sample of build material;

detecting a predetermined color change in the sample of build material that is characteristic of a melting point; and setting a temperature at which the predetermined color change is detected as the first point where the temperature of the sample of build material is constant.

12. A method as claimed in claim 11, wherein detecting the predetermined color change comprises determining whether a color density has reached a specified level.

13. A method as claimed in claim 11, wherein the visual monitoring is performed by:

an optical sensing device; or a temperature sensor; or a thermal sensor; or a thermal sensor array.

14. A method as claimed in claim 1, wherein:

the melting temperature is calibrated once for a particular batch of the build material, and the apparatus is controlled accordingly during subsequent processing of that particular batch of the build material; or the melting temperature is calibrated for the sample of build material from a batch of the build material, and the apparatus is controlled accordingly during subsequent processing of the batch of the build material; or the melting temperature is calibrated for the sample of build material as the build material is being used to build the 3D object.

15. A method as claimed in claim 1, wherein the calibration of the melting temperature of the build material is performed periodically.

* * * * *